Figure 2A:
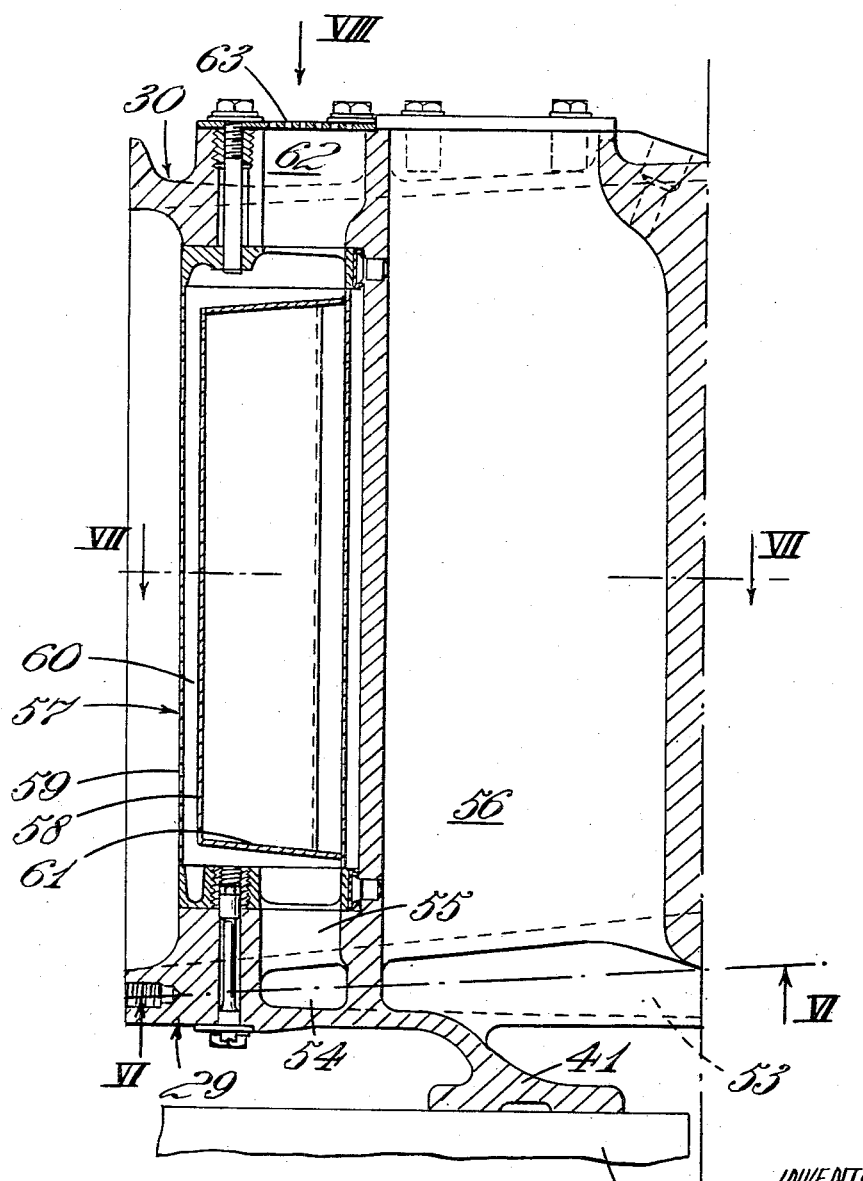

March 25, 1958 F. C. I. MARCHANT ET AL 2,827,760
COMBINED ANTI-ICING AND GENERATOR COOLING ARRANGEMENT
FOR A GAS TURBINE ENGINE
Filed April 14, 1952 9 Sheets-Sheet 1
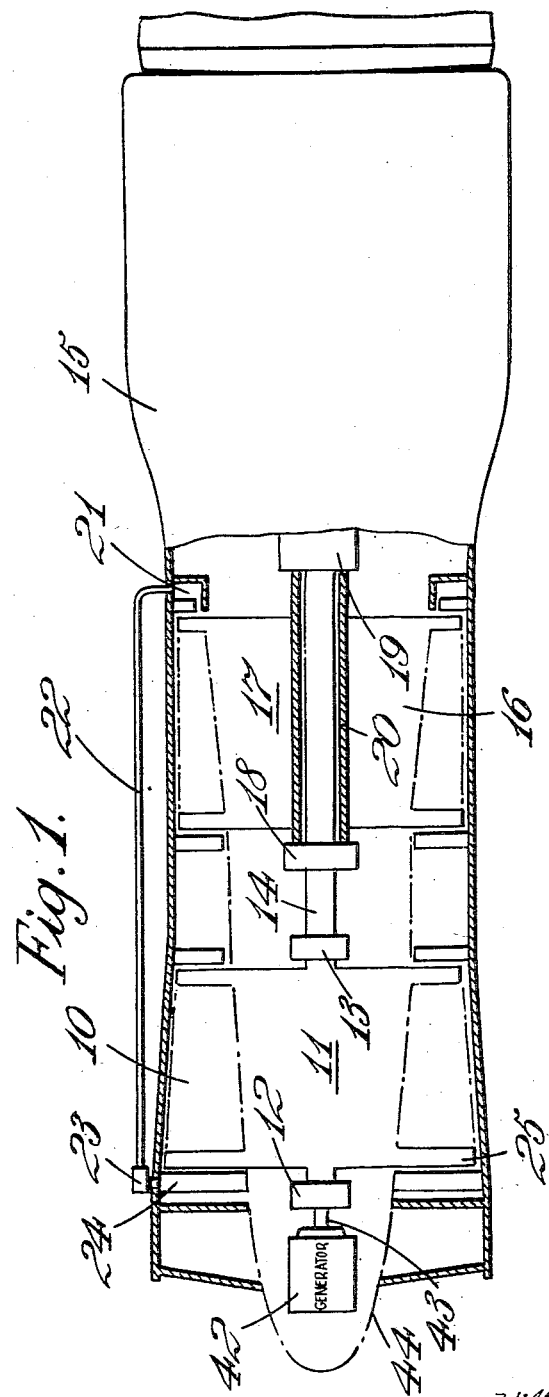
INVENTORS
F. C. I. MARCHANT &
J. E. BELL
BY Wilkinson & Mawhinney
ATTYS.

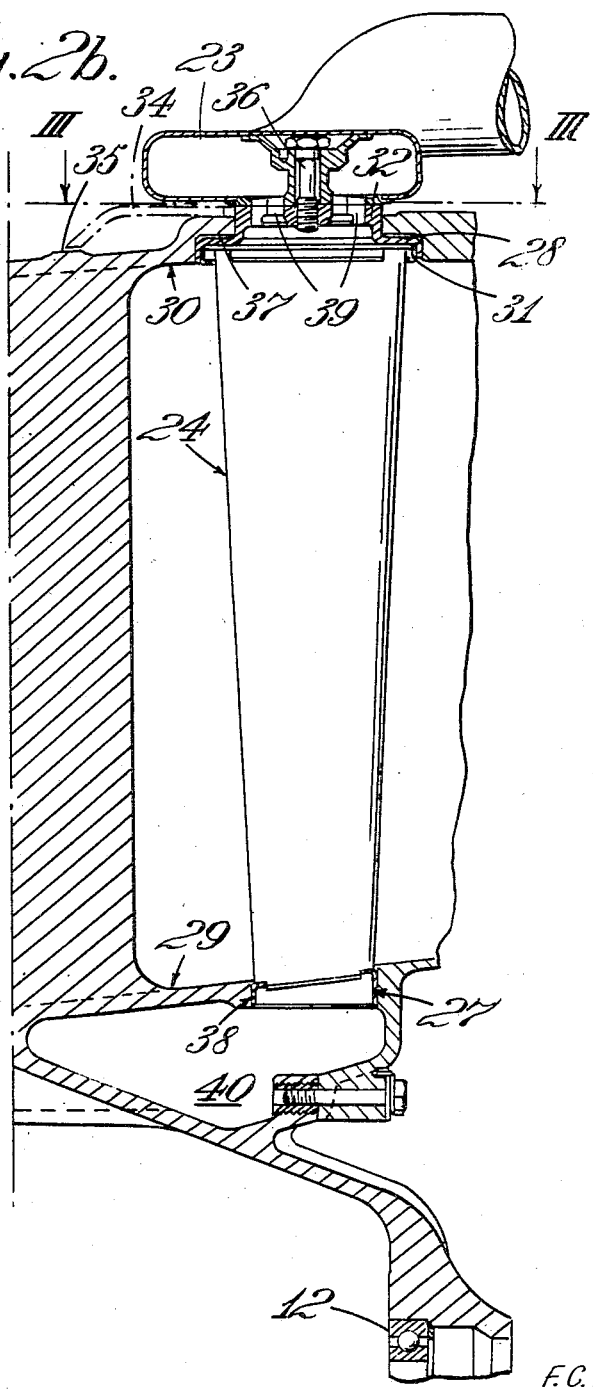

March 25, 1958 F. C. I. MARCHANT ET AL 2,827,760
COMBINED ANTI-ICING AND GENERATOR COOLING ARRANGEMENT
FOR A GAS TURBINE ENGINE
Filed April 14, 1952 9 Sheets-Sheet 4
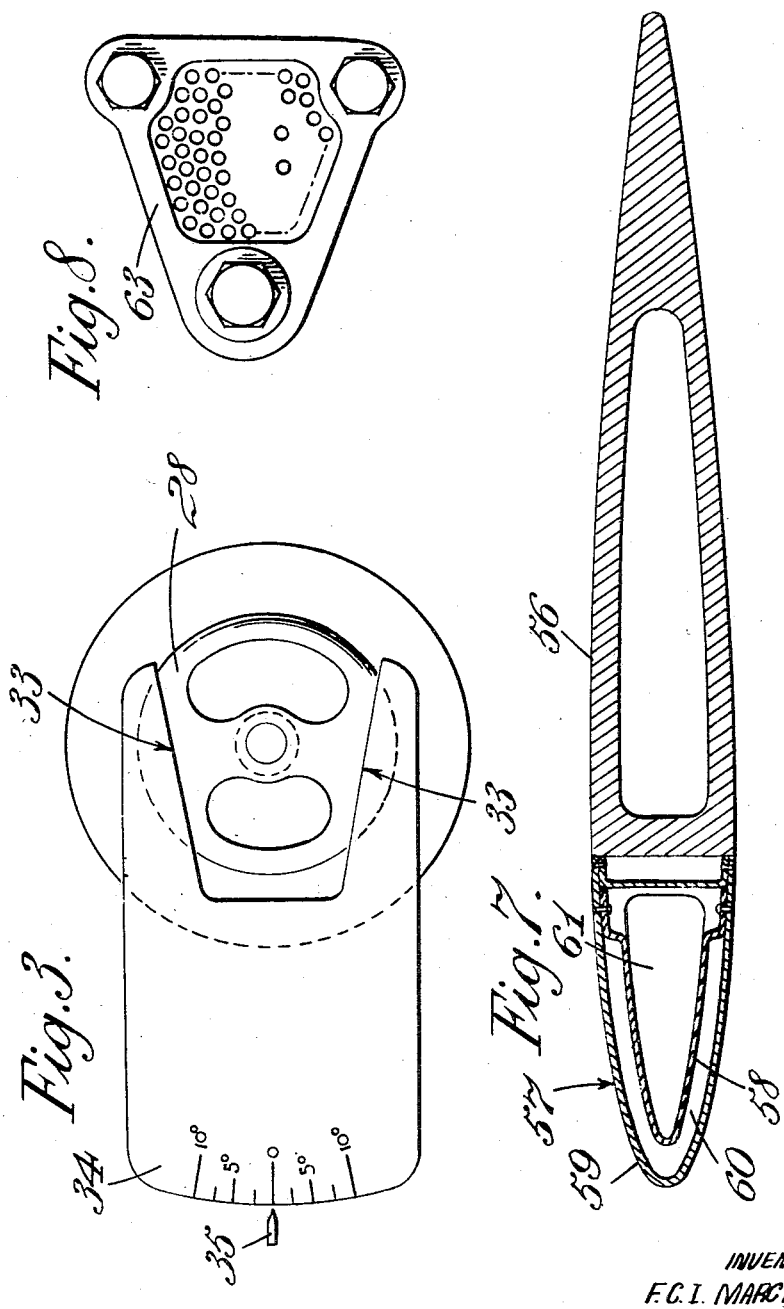
INVENTORS
F.C.I. MARCHANT &
J.E. BELL
BY Wilkinson & Mawhinney
ATTYS.

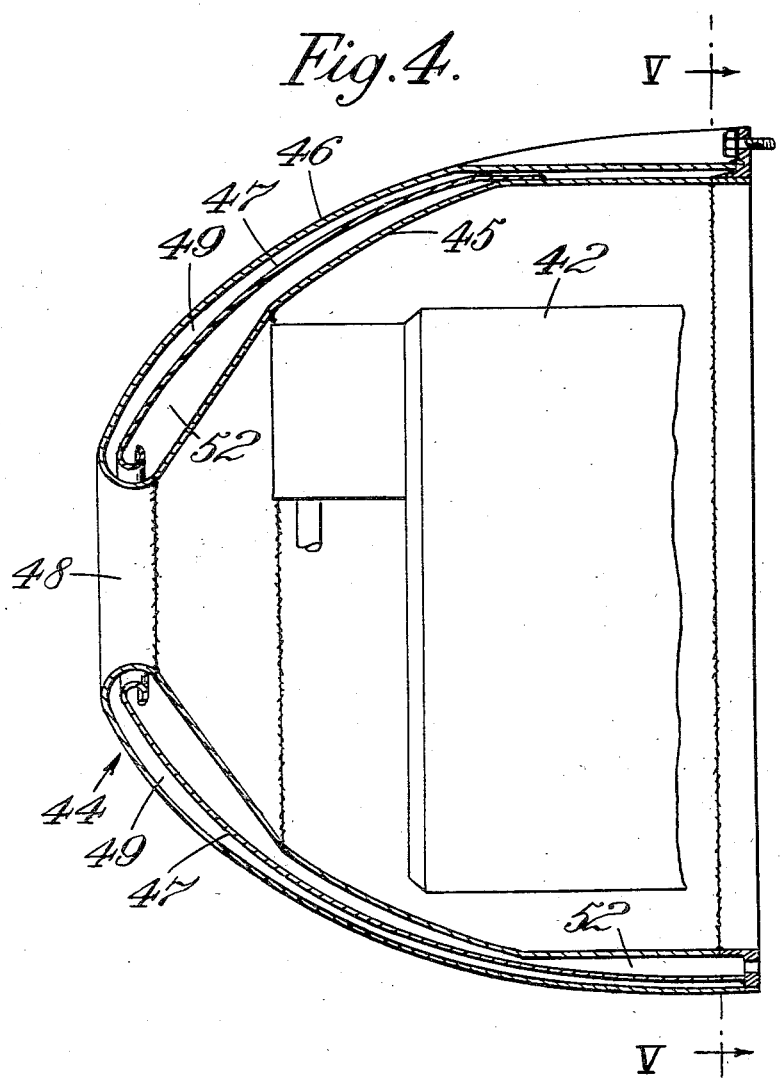

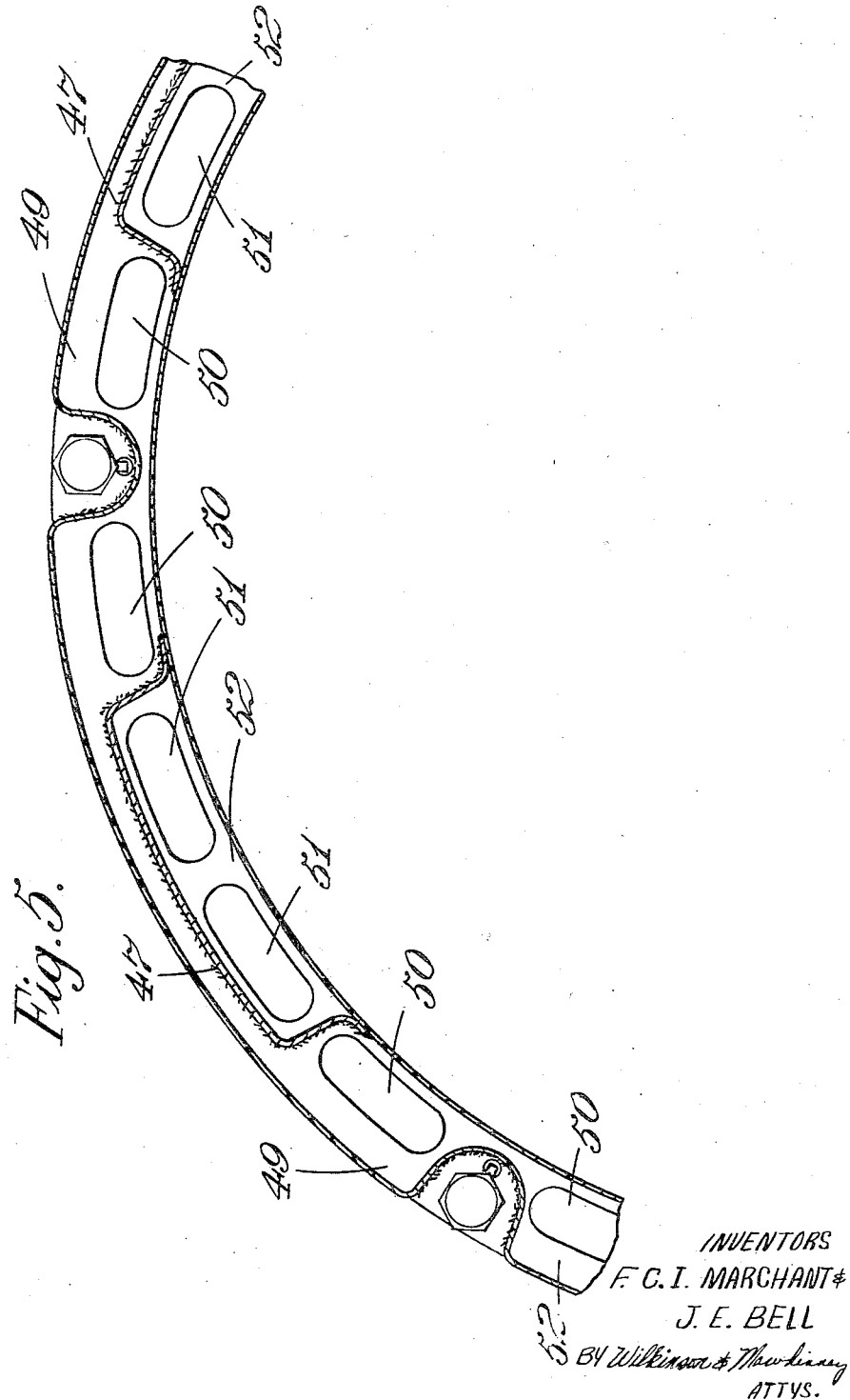

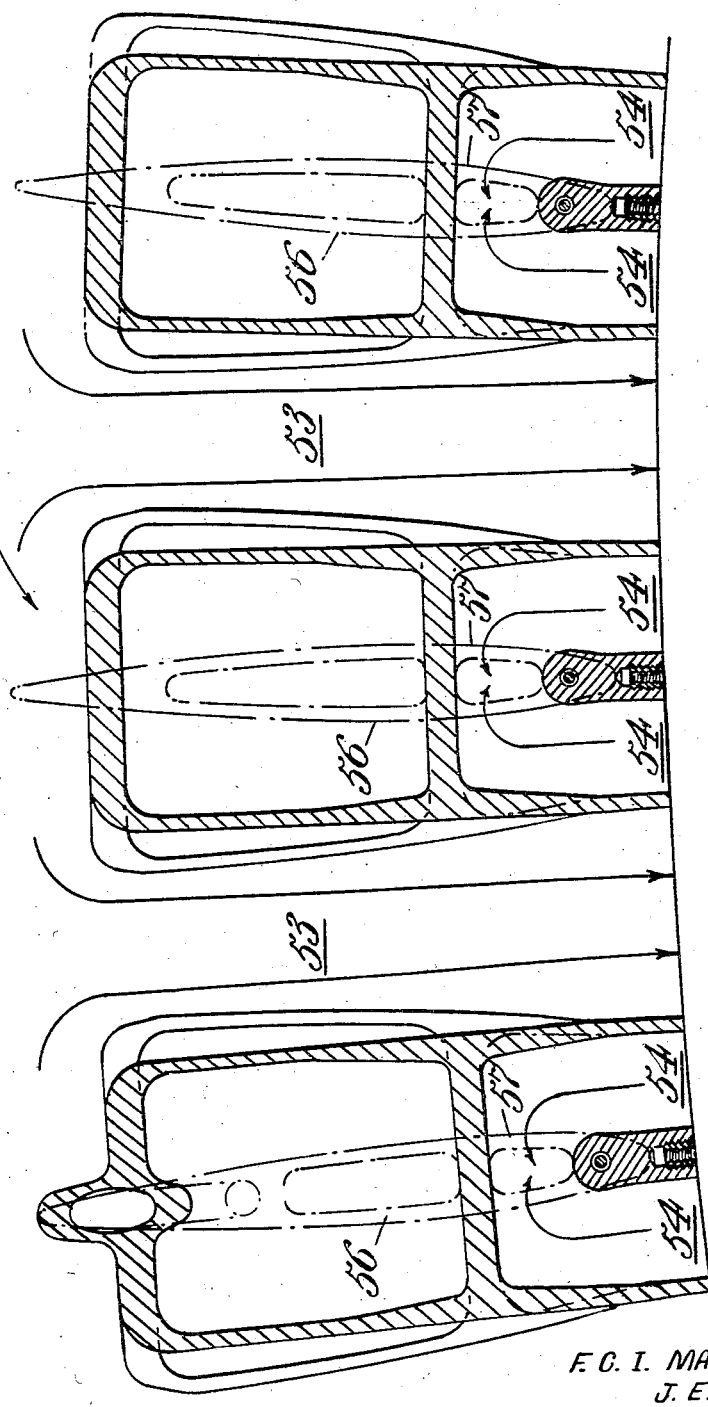

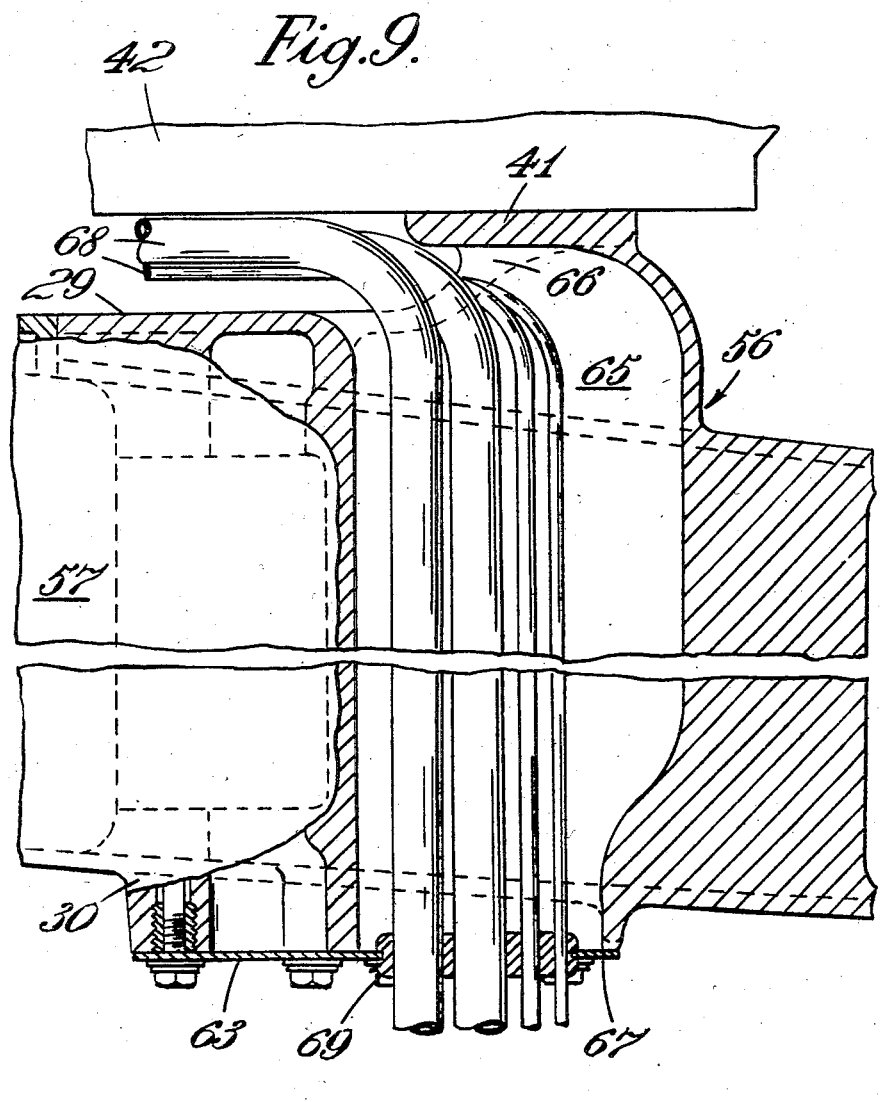

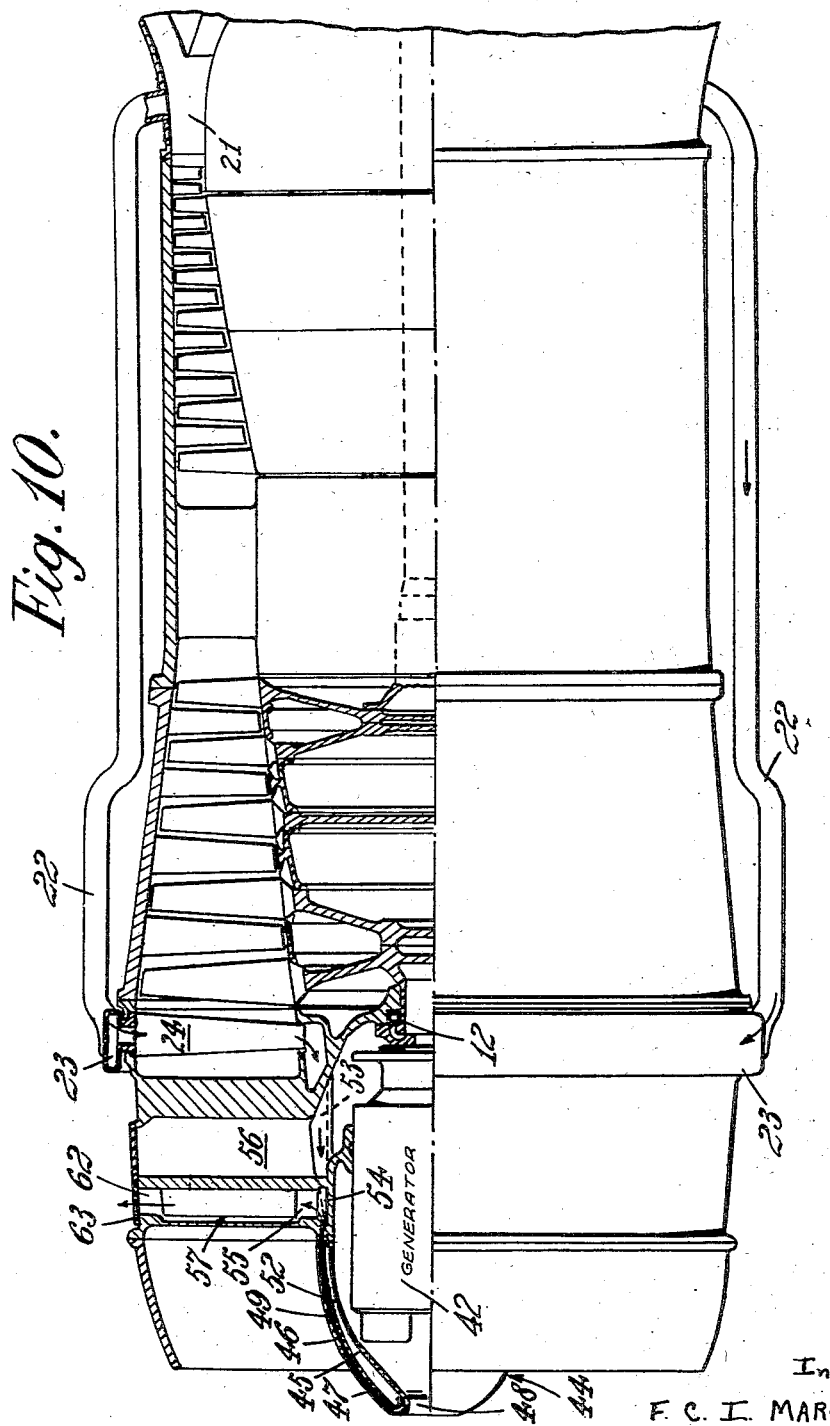

United States Patent Office 2,827,760
Patented Mar. 25, 1958

2,827,760

COMBINED ANTI-ICING AND GENERATOR COOLING ARRANGEMENT FOR A GAS TURBINE ENGINE

Francis Charles Ivor Marchant, Horfield, Bristol, and John Ernest Bell, Mangotsfield, near Bristol, England, assignors, by mesne assignments, to Bristol Aero Engines Limited, Bristol, England, a British company Application April 14, 1952, Serial No. 282,182

Claims priority, application Great Britain April 18, 1951

1 Claim. (Cl. 60—39.09)

This invention relates to anti-icing arrangements for gas turbine engines for aircraft propulsion, and more particularly to such engines in which provision is made for bleeding air from the compressor for cabin pressurization. When air is required for this purpose it is of course not possible to mix with the inflowing air hot air containing products of combustion as has been the practice in some known anti-icing arrangements.

According to the present invention air which has been compressed and thereby heated is bled from the engine before being contaminated by products of combustion, is passed radially inwardly through a first row of hollow compressor stator guide blades and thereafter flows wholly or in part into hollow air intake spider arms and is discharged therefrom either into the airstream flowing into the compressor or to atmosphere.

In one arrangement according to the invention hot air passing inwardly through the first row of compressor stator guide blades flows into casings forming leading edge fairings of the air intake spider arms and is discharged therefrom either through wall openings in the fairings or through gaps between the downstream edges of the fairings and the side surfaces of the spider arms proper.

According to a further feature of the invention, more particularly applicable to a jet propulsion engine, hot air passing inwardly through the first row of compressor stator guide blades flows into the space between the walls of a double-walled entry bullet, and is discharged therefrom into the spider leading-edge fairings referred to in the preceding paragraph.

The interior of the nose bullet may serve to house an electrical generator, cooling air for which is taken in through an opening in the nose and discharged through hollow intake spider arms separately of the hot air passing therethrough.

A practical construction of the present invention will now be described, by way of example only, with reference to the accompanying drawings whereof:

Figure 1 is a diagrammatic side elevation, partly in section, of an axial-flow, jet-propulsion engine in accordance with the present invention, Figures 2a and 2b together constitute a longitudinal sectional elevation of a hollow compressor stator guide blade, and its associated air intake spider arm, forming a part of the engine of Figure 1, Figure 3 is a section on the line III—III of Figure 2b showing a detail of construction of the hollow guide blade, Figure 4 is a sectional elevation of a double-walled entry bullet forming a part of the engine of Figure 1, Figure 5 is a section on the line V—V of Figure 4 and to a larger size, Figure 6 is a development section on the line VI—VI of Figures 2a, 2b, Figure 7 is a section on the line VII—VII of Figures 2a, 2b, Figure 8 is a view in the direction of the arrow VIII of Figure 2a showing a detail of construction, Figure 9 is a part longitudinal section of one of the spider arms through which the electrical cables from the generator are taken, and Figure 10 is a diagrammatic side elevation, partly in section, of a jet propulsion engine in accordance with the present invention and showing the path of flow of the de-icing air.

The gas turbine engine comprises a low-pressure compressor 10 (the rotor 11 of which is supported by bearings 12, 13 and which is driven by shaft 14 from a low-pressure, single-stage turbine of the gas turbine 15) and a high-pressure compressor 16 (the rotor 17 of which is supported by bearings 18, 19 and which is driven by hollow shaft 20, surrounding shaft 14, from a high-pressure single-stage turbine of the gas turbine 15).

Referring to Figure 1: hot air is bled from the outlet 21 of the compressor 17 and taken through external pipes 22 to an annular casing 23 surrounding the entry end of the compressor 11. This compressor has a first row of stationary guide blades 24, preceding the first row of moving blades 25 which are of hollow sheet metal construction as shown in Figure 2b.

Each hollow guide blade 24 is supported at its tip and at its root by a trunnion 27, 28 respectively which are received by an inner and an outer ring 29, 30 so that the blade is capable of rotation about its long axis relatively to the rings. The blade root trunnion 28 is attached to the guide blade by means of a sheet metal cap 31 which accurately fits the blade and is brazed or otherwise attached, to form a gas tight joint, to the trunnion 28. The latter passes through the ring 30 and the projecting portion 32 is formed with a pair of inclined faces 33 (Figure 3) which are adapted to receive a spanner 34 one face of which is graduated in degrees to co-operate with a line 35 scribed on the ring 30. A bolt 36 passes through the annular casing 23 and is received by the trunnion 28. When the bolt 36 is unscrewed and the spanner 34 applied to the faces 33 the blade 24 may be angularly adjusted, the extent of adjustment being determined by the spanner in co-operation with the line 35. In this way the angular disposition of the guide blades in relation to the stream of air may be adjusted.

It will be noted from the drawings (Figure 2b) that there is a radial clearance space 37 between the trunnion 28 and the ring casing 30 which permits of differential expansion of the parts, the blades moving with the annular casing 23. To permit such movement the blade tip trunnion is received in a parallel bore 38 in the inner ring so that the blade is permitted freedom of movement in its lengthwise direction.

Air from the casing 23 passes through holes 39, along the hollow guide blades 24 and into an annular collecting chamber 40 at the inner ends of the blades. The collecting chamber is formed in the inner ring 29 which, as is apparent from the drawings, is a casting. The inner ring is bolted to the forward framework of the compressor 11. Similarly the outer ring 30 is bolted to this framework. The inner ring, besides forming the collecting chamber, supports the bearing assembly 12 of the compressor 11 and also provides a mounting (part of which is indicated at 41, Figure 2a) for an electrical generator 42 arranged co-axially with the compressor (Figure 1) and coupled to it by shaft 43 for driving purposes. The generator projects forwardly from the inner ring and is covered by a nose-bullet fairing 44 (Figures 4 and 5).

The bullet fairing 44 comprises inner and outer walls 45, 46 respectively between which is mounted a plurality of circumferentially-spaced baffles 47. At the extreme forward end of the fairing there is an opening 48 for the admission of cooling air to the generator 42. The space 49 between the outer wall and the baffles 47 communicates with a plurality of circumferentially spaced openings 50 which are intercalated with similar openings 51 communicating with the space 52 between the inner wall and the baffles. The holes 51 communicate with passageways 53 in the inner ring 29 which all lead to the collecting chamber 40 (Figure 6 and Figure 10). Accordingly air delivered to the collecting chamber 40 through the hollow guide blades 24 passes along the passageways 53 and into the space 52. This air passes along the bullet and is returned along space 49, goes through openings 50 and into passageways 54 in the inner ring casting 29. With the arrangement described the hot air flowing along the bullet does not pass over the outside of the generator. Passageways 54, which are circumferentially spaced arranged around the ring and alternate with the passageways 53, communicate with channels 55 in the inner ring (Figure 2) and for each channel there is provided a hollow spider arm 56 (see Figures 2, 6, 7) by which the inner and outer rings 29, 30 are connected together. The channels 55 are in communication with casings 57 forming leading edge extensions of the arms 56, these casings being of sheet metal construction. The leading-edge portions 57 are formed with an inner and an outer wall 58, 59 respectively which define a space 60 between them and both ends of wall 58 are closed by a plate 61 (Figure 2). Accordingly the air delivered from the channels 55 is constrained to pass along space 60 and is delivered therefrom into a compartment 62 formed in the outer ring 30. The compartment communicates with atmosphere through an opening which is closed by a screen or grid 63 (Figure 8) through which the air is discharged.

The spider arms 56 are of hollow construction whereby there is formed lengthwise extending passageways 65. One or more of the hollow spider arms 56 are in communication with the interior of the nose bullet 44 through openings 66 so that the cooling air entering the bullet through the opening 48 for the generator 42 passes through the opening 66 and along the passageways 65 and is discharged through a screen or grid 67 (Figure 9). The cables 68 from the electrical generator 42 are taken through the passageway 65 of one or more of the spider arms 56 and are supported by means of a rubber bushing 69 carried by the screen or grid 67. Thus, the cooling air for the generator 42 is discharged through the passageways 65 and the screen or grid 67 to atmosphere.

In the construction described the hottest air (i. e. from the compressor 16) is passed through the guide blades 24 immediately preceding the first row of moving blades 25 where the avoidance of ice deposits is of the greatest importance and the relatively cooler air is used for warming the more forwardly situated parts 57. The waste heat from the generator 42 is carried away by the air entering the bullet 44 at 48, the air being passed through the passageways 65 in one or more of the spider arms 56 and discharged to atmosphere through the screen or grid 67.

Since the hot air is not passed into the air stream flowing through the compressor it is possible with the arrangement described to incorporate a heater whereby the temperature of the air may be raised above that provided by the compressor 16 without fear of contamination of the air flowing through the compressor.

With the arrangement described with reference to the drawings the hot air passes through the bullet and is discharged into the passageways 54. However, air may pass along the bullet and be discharged into the interior thereof to flow over the generator 42, being discharged therefrom through the passageways 65 for instance.

We claim:

In a gas turbine engine, a compressor system comprising an annular air inlet and an air discharge outlet, a row of hollow stator guide vanes at said inlet, a duct communicating between said air discharge outlet and the interiors of said hollow stator guide vanes at the radially outer ends thereof to convey compressed air from said air discharge outlet to the interiors of said hollow stator guide vanes, an entry nose bullet, an electrical generator housed in said entry nose bullet, said entry nose bullet being of double walled construction, the entry nose bullet having an inner wall and an outer wall defining between them a space, a second duct communicating between the interiors of said hollow guide vanes at the radially inner ends thereof and said space to convey compressed air from the interiors of said guide vanes into said space, a bearing for said compressor, a plurality of hollow spider arms for supporting said bearing, said spider arms extending across said annular air intake, a third duct communicating between said space and the interiors of said hollow spider arms at the radially inner ends thereof to convey compressed air from said space to the interiors of said spider arms, air outlet ports from said hollow spider arms for discharging compressed air entering said spider arms from said space, said entry nose bullet having an opening in its nose for the admission of generator cooling air, and passage means in at least one of said spider arms, said passage means communicating the interior of said entry nose bullet with the atmosphere outside said annular air inlet, whereby the generator cooling air, after passing over the generator, is discharged through said passage means clear of the airstream flowing through said annular air inlet.

References Cited in the file of this patent

UNITED STATES PATENTS

| | | |
|---|---|---|
| 2,441,135 | Chalupa | May 11, 1948 |
| 2,469,375 | Flagle | May 10, 1949 |
| 2,594,118 | Boyd | Apr. 22, 1952 |
| 2,599,470 | Meyer | June 3, 1952 |
| 2,600,302 | Kinsella | June 10, 1952 |
| 2,630,965 | Greatrex et al. | Mar. 10, 1953 |
| 2,718,350 | Burgess | Sept. 20, 1955 |

FOREIGN PATENTS

| | | |
|---|---|---|
| 619,390 | Great Britain | Mar. 8, 1949 |
| 637,598 | Great Britain | May 24, 1950 |